US012776926B2

(12) United States Patent
Zhu

(10) Patent No.: US 12,776,926 B2
(45) Date of Patent: Oct. 27, 2026

(54) DATA PROCESSING METHOD AND APPARATUS BASED ON BLOCKCHAIN NETWORK

(71) Applicant: Tencent Technology (Shenzhen) Company Limited, Shenzhen (CN)

(72) Inventor: Gengliang Zhu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 361 days.

(21) Appl. No.: 17/940,154

(22) Filed: Sep. 8, 2022

(65) Prior Publication Data

US 2023/0006846 A1 Jan. 5, 2023

Related U.S. Application Data

(63) Continuation of application No. PCT/CN2021/123946, filed on Oct. 15, 2021.

(30) Foreign Application Priority Data

Nov. 23, 2020 (CN) ......................... 202011316889.6

(51) Int. Cl.
*H04L 9/00* (2022.01)
*G06F 12/0871* (2016.01)
*H04L 67/1061* (2022.01)

(52) U.S. Cl.
CPC ............ *H04L 9/50* (2022.05); *G06F 12/0871* (2013.01); *H04L 67/1065* (2013.01)

(58) Field of Classification Search
None
See application file for complete search history.

(56) References Cited

U.S. PATENT DOCUMENTS

2017/0331896 A1* 11/2017 Holloway ............... H04L 67/04
2019/0342078 A1* 11/2019 Li ....................... H04L 67/1095
(Continued)

FOREIGN PATENT DOCUMENTS

CN 109447648 3/2019
CN 110535872 12/2019
(Continued)

OTHER PUBLICATIONS

International Search Report issued Jan. 13, 2022 in International (PCT) Application No. PCT/CN2021/123946.
(Continued)

*Primary Examiner* — Kevin S Mai
(74) *Attorney, Agent, or Firm* — Crowell & Moring LLP

(57) ABSTRACT

This disclosure relates to data processing method and apparatus based on a blockchain network. The method may include receiving a data acquisition request transmitted by a target service node. The data acquisition request may carry a data type of data requested by the target service node and a data identifier set. The method may further include determining a target node set from the nodes in the blockchain network according to the data type, the data identifier set, and recorded data storage information of the nodes. The method may further include transmitting feedback information carrying the node information in the target node set to the target service node. The feedback information is for instructing the target service node to acquire the requested data from a node according to the node information in the target node set.

19 Claims, 7 Drawing Sheets

(56) References Cited

U.S. PATENT DOCUMENTS

| | | | | |
|---|---|---|---|---|
| 2020/0296152 | A1* | 9/2020 | Liu | H04L 63/123 |
| 2021/0203509 | A1 | 7/2021 | Li et al. | |
| 2021/0256007 | A1* | 8/2021 | Wu | H04L 9/3239 |
| 2023/0275944 | A1* | 8/2023 | Slater | H04B 7/18508<br>709/231 |

FOREIGN PATENT DOCUMENTS

| | | |
|---|---|---|
| CN | 110602096 | 12/2019 |
| CN | 110619520 | 12/2019 |
| CN | 110708170 | 1/2020 |
| CN | 111461852 | 7/2020 |
| CN | 111597567 | 8/2020 |
| CN | 111597567 A | 8/2020 |
| CN | 111835570 | 10/2020 |
| CN | 112104517 | 12/2020 |
| EP | 3 496 329 | 6/2019 |
| WO | 2018/209543 | 11/2018 |
| WO | 2019/227225 | 12/2019 |

OTHER PUBLICATIONS

Extended European Search Report dated jan. 23, 2024 from European Application No. 21 893 647.4 (67 pages).

* cited by examiner

DATA PROCESSING METHOD AND APPARATUS BASED ON BLOCKCHAIN NETWORK

RELATED APPLICATION

This application is a continuation application of PCT Patent Application No. PCT/CN2021/123946, filed on Oct. 15, 2021, which claims the priority of Chinese patent application No. 202011316889.6, filed with the China Intellectual Property Administration on Nov. 23, 2020 and entitled "Data Processing Method based on Blockchain Network and Related Apparatus," wherein the content of each of the above-referenced applications is incorporated herein by reference in its entirety.

FIELD OF THE TECHNOLOGY

This disclosure relates to the technical field of blockchains, in particular to a data processing method based on a blockchain network, a data processing apparatus based on a blockchain network, a computer device, and a computer-readable storage medium.

BACKGROUND OF THE DISCLOSURE

The advent of the era of science and technology and the development of the mobile Internet have accelerated the pace of network transformation. The process of realizing information fusion in the same field or multiple fields so as to provide users with comprehensive informatization solutions also faces new challenges such as improvement of a system structure and shifting of a supporting center of gravity. Therefore, as a specific implementation of distributed ledgers, a blockchain technology has gradually become a preferred way for data storage and data transaction in various fields by virtue of its natural advantage of storing and managing data.

A blockchain network is a distributed system formed by a plurality of nodes, and a peer to peer (P2P) network is formed between the nodes.

At present, P2P solutions for blockchain products are usually a single-layer, unified P2P, that is, node peering, which are located in the same network. However, when a blockchain product is used in some application scenarios such as the government or a commercial organization, not all blockchain participating nodes have sufficient resources and necessity to become nodes participating in blockchain consensus. For the sake of data security, when data related to personal privacy or national security is involved in a blockchain system, it is not suitable for using a general data peering P2P blockchain deployment method. It can be seen that the single-layer (i.e., node peering) P2P solution is not applicable to the above-mentioned various application scenarios. In addition, for the blockchain network that adopts the node peering P2P solution, a node usually acquires desired data from other nodes randomly.

SUMMARY

Embodiments of this disclosure provide a data processing method and apparatus based on a blockchain network, a computer device, and a computer-readable storage medium.

In one aspect, an embodiment of this disclosure provides a data processing method based on a blockchain network. The blockchain network includes a witness network and a consensus network, the witness network is formed by networking a plurality of service nodes, the consensus network is formed by networking a plurality of consensus nodes, and the witness network and the consensus network are connected through a gateway device. The method may include receiving a data acquisition request transmitted by a target service node. The data acquisition request may carry a data type of data requested by the target service node and a data identifier set. The method may further include determining a target node set from the nodes in the blockchain network according to the data type, the data identifier set, and recorded data storage information of the nodes in the blockchain network. The target node set may include one or more of node information determined from the service nodes in the witness network and node information determined from the consensus nodes in the consensus network. The method may further include transmitting feedback information carrying the node information in the target node set to the target service node. The feedback information is for instructing the target service node to acquire the requested data from a node according to the node information in the target node set.

In one aspect, an embodiment of this disclosure provides a data processing apparatus based on a blockchain network, wherein the blockchain network includes a witness network and a consensus network, the witness network is formed by networking a plurality of service nodes, the consensus network is formed by networking a plurality of consensus nodes, and the witness network and the consensus network are connected through a gateway device. The apparatus may include a memory operable to store computer-readable instructions and a processor circuitry operable to read the computer-readable instructions. When executing the computer-readable instructions, the processor circuitry may be configured to receive a data acquisition request transmitted by a target service node. The data acquisition request may carry a data type of data requested by the target service node and a data identifier set. The processor circuitry may be further configured to determine a target node set from the nodes in the blockchain network according to the data type, the data identifier set, and recorded data storage information of the nodes in the blockchain network. The target node set may include one or more of node information determined from the service nodes in the witness network and node information determined from the consensus nodes in the consensus network. The processor circuitry may be further configured to transmit feedback information carrying the node information in the target node set to the target service node. The feedback information is for instructing the target service node to acquire the requested data from a node according to the node information comprised in the target node set.

In one aspect, an embodiment of this disclosure provides a non-transitory machine-readable media having instructions stored on the machine-readable media. The instructions are configured to implement data processing based on a blockchain network. The blockchain network may include a witness network and a consensus network, the witness network may be formed by networking a plurality of service nodes, the consensus network may be formed by networking a plurality of consensus nodes, the witness network and the consensus network may be connected by a gateway device. When being executed, the instructions may be configured to cause a machine to receive a data acquisition request transmitted by a target service node. The data acquisition request may carry a data type of data requested by the target service node and a data identifier set. The instructions may be further configured to cause the machine to determine a target node set from the nodes comprised in the blockchain network according to the data type, the data identifier set, and recorded data storage information of the nodes in the blockchain network. The target node set may include one or more of node information determined from the service nodes in the witness network and node information determined from the consensus nodes in the consensus network. The instructions may be further configured to cause the machine to transmit feedback information carrying the node information comprised in the target node set to the target service node. The feedback information may be for instructing the target service node to acquire the requested data from a node according to the node information comprised in the target node set.

Correspondingly, an embodiment of this disclosure provides a computer program product or a computer program. The computer program product or the computer program includes computer instructions, and the computer instructions are stored in a computer readable storage medium. A processor of a computer device reads the computer instruction from the computer readable storage medium, and the processor executes the computer instruction, so that the computer device implements the data processing method based on a blockchain network.

BRIEF DESCRIPTION OF THE DRAWINGS

To describe the technical solutions in the embodiments of this disclosure or the related art more clearly, the following briefly describes the accompanying drawings required for describing the embodiments or the related art. Apparently, the accompanying drawings in the following description show merely some embodiments of this disclosure, and a person of ordinary skill in the art may still derive other drawings from the accompanying drawings without creative efforts.

DESCRIPTION OF EMBODIMENTS

The technical solutions in the embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without making creative efforts shall fall within the protection scope of this disclosure.

In order to better understand the embodiments of this disclosure, some terms and a blockchain technology involved in the embodiments of this disclosure are first introduced below.

Certificate: It refers to a public key infrastructure (PKI). In the certificate system, a certificate is an identity certificate of a public key owner and is issued by a certificate authority (CA). Asymmetric encryption and digital signatures for information can be achieved based on the PKI.

PKI: It refers to a public key infrastructure (PKI), mainly including public and private key passwords, an X509 certificate, a CA, and the like.

P2P network: It refers to a peer-to-peer network in which there is no need for a central node to maintain the network state between network nodes based on a specific type of network protocol, but each node maintains states of nodes in the whole network or the connected state with an adjacent node by broadcasting interaction with the adjacent node.

Figure 1:
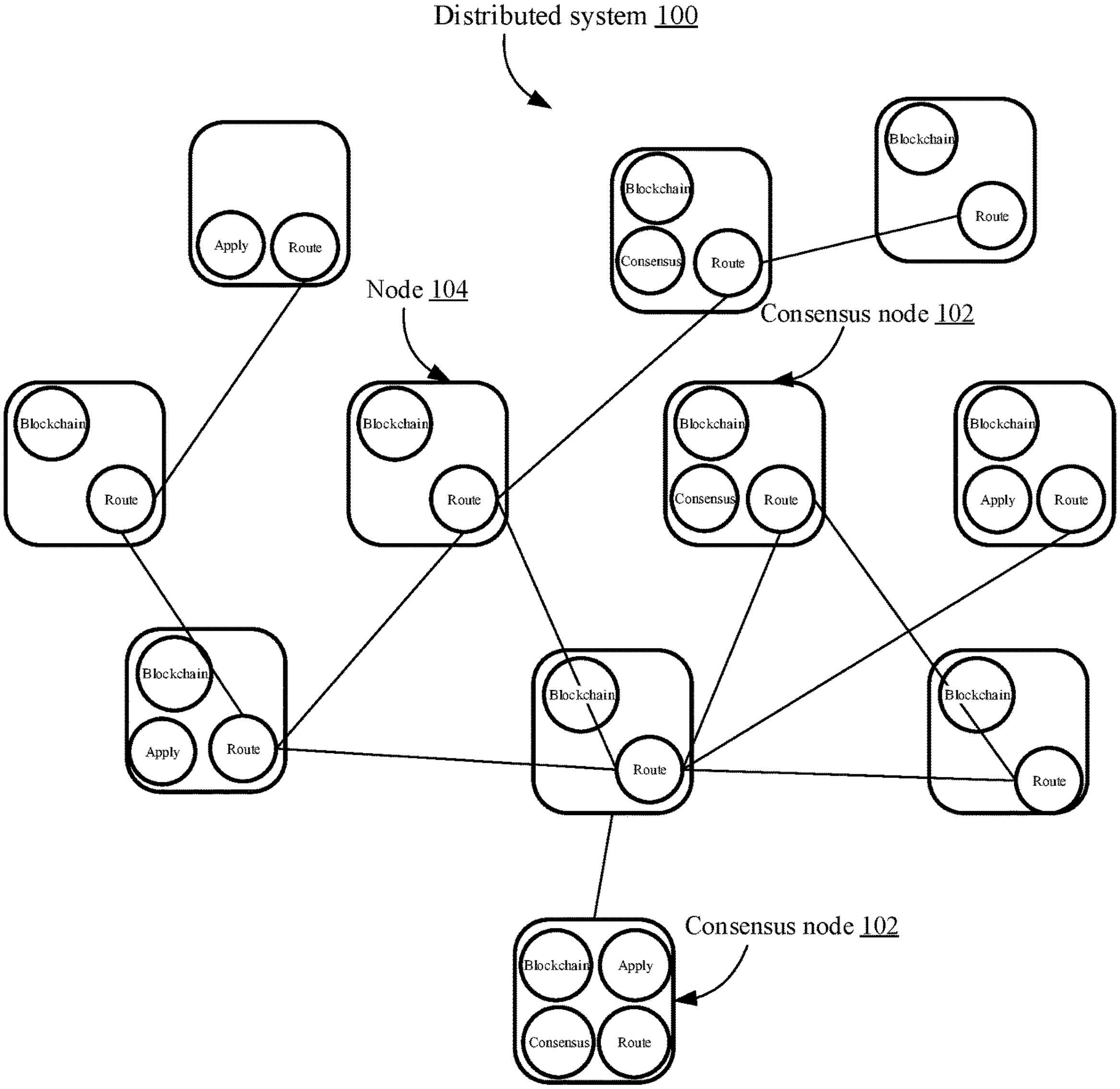
FIG. 1 is a schematic architecture diagram of a distributed system according to an embodiment of this disclosure.

A blockchain network is a distributed system that can be formed by connecting a plurality of nodes (computing devices in any form, which are connected to a network, such as servers and user terminals) by network communication. Referring to FIG. 1, an optional schematic architecture diagram of a distributed system 100 according to an embodiment of this disclosure applied to a blockchain network is illustrated. A blockchain network is formed by a plurality of nodes. A peer-to-peer (P2P) network is formed between the nodes. The P2P protocol is an application-layer protocol running over the Transmission Control Protocol (TCP). In the blockchain network, any machine such as a server or a terminal may be added to the distributed system to become a node. The nodes include a hardware layer, an intermediate layer, an operating system layer, and an application layer.

Referring to functions of each node in the blockchain network shown in FIG. 1, the related functions include the following:

(1) Routing: which is a basic function of a node, and is used for supporting communication between nodes.

In addition to the routing function, the node may further have the following functions:

(2) Blockchain: which includes a series of blocks that are consecutive in a chronological order of generation. Once a new block is added to the blockchain, the new block is no longer removed. The block records recorded data such as transaction data submitted by the node in the blockchain network.

Figure 2:
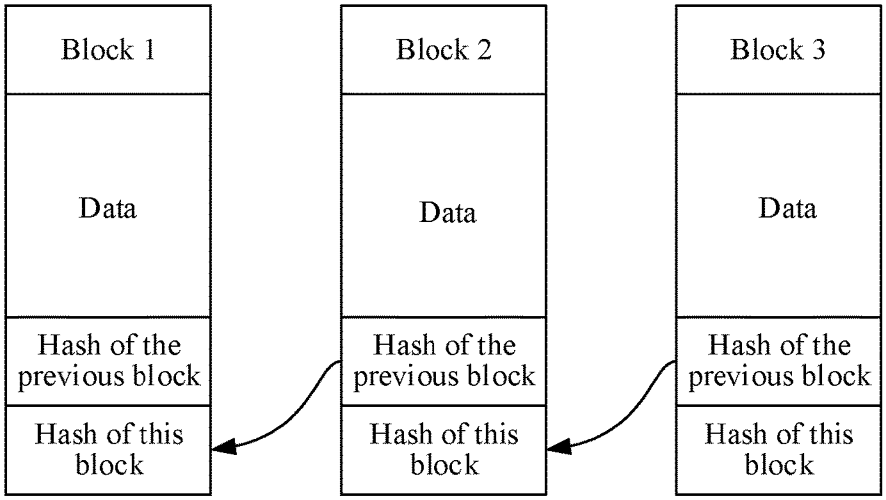
FIG. 2 is a schematic structural diagram of a block according to an embodiment of this disclosure.

FIG. 2 is an optional schematic diagram of a block structure according to an embodiment of this disclosure. Each block includes a hash value of a data record stored in the current block (a hash value of the current block) and a hash value of a previous block. Blocks are connected according to hash values to form a blockchain. In addition, the block may further include information such as a timestamp indicating a block generation time. A blockchain is essentially a decentralized database, and is a string of associated data blocks generated by using a cryptology method. Each data block includes related information used for verifying the validity (anti-counterfeiting) of information of the data block and generating a next block.

(3) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain network, so that the another node adds the recorded data to a temporary block when successfully verifying a source and integrity of the recorded data.

For example, services implemented by the application include:

3.1) Wallet: used for providing a transaction function with virtual resources, including transaction initiation (that is, a transaction record of a current transaction is transmitted to another node in the blockchain network, and the another node stores, after successfully verifying the transaction record, recorded data of the transaction to a temporary block in a blockchain in response to admitting that the transaction is valid). Certainly, the wallet further supports querying for remaining electronic money in an electronic money address.

(3.2) Shared ledger: used for providing functions of operations such as storage, query, and modification of account data. Recorded data of the operations on the account data is transmitted to another node in the blockchain network. The another node stores, after verifying that the account data is valid, the recorded data to a temporary block in response to admitting that the account data is valid, and may further transmit an acknowledgement to a node initiating the operations.

3.3) A smart contract is a computerized protocol, may be used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring virtual resources of the purchaser to an address of a merchant after the purchaser signs for the goods. Certainly, the smart contract is not limited only to a contract used for executing a transaction, and may be further a contract used for processing received information.

4) Consensus is used for solving and ensuring the consistency and correctness of each transaction or data on all accounting nodes. A consensus mechanism of blockchain is to determine a way of reaching a certain consensus and maintaining the consensus. The consensus mechanism of blockchain still makes it possible to complete operation efficiently and collaboratively on a large scale even without relying on a centralized organization.

As shown in FIG. 1, nodes in a blockchain network include consensus nodes 102 (i.e., accounting nodes that run a blockchain consensus protocol) and other types of nodes 104. A consensus node is a node in a blockchain network that has a block production function and a consensus function, and can be a full node that stores a complete blockchain in the blockchain network. The consensus nodes 102 in the blockchain network can be divided into master nodes and slave nodes. The so-called master node refers to a consensus node that is in charge of producing blocks (i.e., generating blocks) at a current stage, and the so-called slave node refers to a consensus node in the blockchain network other than the master nodes. The current stage can refer to a current block height. The consensus nodes and other types of nodes can be computer devices such as terminals or servers. The server may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The terminal may be a smartphone (such as an Android smartphone, an iOS smartphone, or the like), a tablet computer, a notebook computer, a desktop computer, a smart speaker, a smart watch, or the like, but is not limited thereto. Each node may be directly or indirectly connected in a wired or wireless communication manner. This is not limited in this disclosure.

At present, P2P solutions for blockchain products are all a single-layer, unified P2P, that is, node peering, which are located in the same network (as shown in FIG. 1). P2P solutions in several application scenarios are introduced below.

1. P2P solution in a blockchain technology for public chains such as Bitcoin and Ethereum:

Nodes in a Bitcoin network have four main functions: wallet, mining, blockchain database, and network routing. Each node has a routing function, but does not have all other functions. Generally, only a Bitcoin core node has all the four functions. A node with all the functions is also referred to as a full node. Most of other nodes are simplified payment verification (SPV) nodes except that a Bitcoin core wallet is a full node. Users can check their account balances, manage wallet addresses and private keys, and initiate transactions through these SPV wallets. Another type of node is a mining node. If the node stores all data of a block, it is also a full node, generally an independent miner.

There is a type of mining node that does not achieve mining independently, but this type of mining node will be connected with other nodes to form a mining pool for collective mining, which is referred to as a collective miner. A mining pool network will also be formed. It is a centralized network taking a mining pool server as a central node, and other miners are connected to the central node. Communication between the miners and the mining server is achieved by its own mining pool protocol, instead of a Bitcoin protocol. A mainstream mining pool protocol is a Stratum protocol. In addition, after a miner creates a new block, the miner also needs to broadcast the block to all nodes in the whole network. A reward to the miner is valid only after the whole network accepts the block, and then Hash calculation of a next block will be started. Therefore, the miner needs to minimize the time for broadcasting a new block and calculating the next block. Therefore, a special broadcast network is required to speed up the dissemination of blocks. This broadcast network is also referred to as a Bitcoin relay network.

In the Bitcoin network, one node can transmit a peer list that it maintains to neighboring nodes. Therefore, after an initial node finds the peer list, a node list is required to be copied from the neighboring nodes. Like Bitcoin, Ethereum also has four main functions: wallet, mining, blockchain database, and block routing. There are also different types of nodes. The biggest difference from the Bitcoin's P2P network structure is that Ethereum's P2P is structured. The Ethereum network is implemented by a Kademlia (Kad) algorithm. This algorithm can be used to quickly and accurately route and locate data problems.

A routing table of Kad is constructed from data referred to as K-buckets that record information, such as Nodeld, distance, endpoint, and ip, of nodes. The K-buckets are sorted according to distances from a target node. There are 256 K-buckets in total, and each K-bucket contains 16 nodes. The communication between the nodes in the Kad network is based on the User Datagram Protocol (UDP), which is mainly composed of the following several commands. Corresponding nodes are considered to be online if PING-PONG handshake between two nodes succeeds. ping command: detecting a node to determine whether it is online. PONG: response to ping. FIND_NODE: querying the nodes for a node that is close to the ID of a target node. NEIGHBORS: in response to FIND_NODE command, transmitting the nodes, close to the ID of the target node, in the K-bucket.

Description of the process of finding out neighbor nodes:

A system is started for the first time to randomly generate NodeId of a local node, which is denoted as LocalId. LocalId remains constant once it is generated. The local node is denoted as local-eth. The system reads public node information, and writes the public node information into a K-bucket after the PING-PONG handshake is completed. The system refreshes the K-bucket every 7,200 ms.

The process of refreshing the K-bucket is as follows:

a. Randomly generate Id of a target node, which is denoted as TargetId, and record the number of findings and refresh time from 1.b. Calculate a distance between TargetId and LocalId, which is denoted as Dlt.c. Denote NodeId of each node in the K-bucket as KadId, and calculate a distance between KadId and TargetId, which is denoted as Dkt.d. Find out a node, whose Dlt is greater than Dkt, in the K-bucket, denote the node as a K-bucket node, and transmit a FIND_NODE command to the K-bucket node. The FIND_NODE command contains the TargetId.e. Perform steps b to d after the K-bucket node receives the FIND_NODE command, and transmit the node found in the K-bucket back to the local node using a NEIGHBORS command.f. Write the received node into the K-bucket after the local node receives the NEIGHBORS command.g. Perform step b when the number of searches does not exceed a preset number of times (such as 8) and the refresh time does not exceed a preset duration (such as 600 ms).

2. P2P Solution for Consortium Chains Such as Fabric and Terdermint:

Fabric's P2P network is a data encapsulation network based on a Gossip protocol. The gossip process is initiated by a seed node. When one seed node has a state that is required to be updated to other nodes in the network, several surrounding nodes will be randomly selected to spread a message. Nodes that receive the message will also repeat this process, until finally all the nodes in the network have received the message. This process may take certain time. All the nodes cannot be ensured to receive the message at certain time, but in theory, all the nodes will eventually receive the message, so the Gossip protocol is a final consistency protocol.

Types of Gossip Protocols:

Dissemination protocol/rumor-mongering protocol: This protocol works through a flooding agent in the network. After a node receives broadcast data, the node directly forwards the data to all neighbor nodes. This way can improve the robustness of the network, but a broadcast storm is easily caused.

Anti-entropy protocol: This protocol is used for repairing replicated data and is operated by comparing a difference between replication and coordination. Data synchronization in Hyperledger Fabric is implemented in this way.

Protocol for calculating aggregates: This protocol samples information of the nodes in the network and combines these values to obtain a system-wide value, thus calculating a network-wide set; a comprehensive information flow mode will then be established.

Two data transmission ways of a Gossip data distribution protocol:

(1) Push-Based:

A certain node in the network randomly selects N nodes as data receiving objects, and the node transmits corresponding information to the selected N nodes. The nodes that have received the information process the received data, and the nodes that have received the data repeat the process from the first step.

(2) Pull-Based:

A certain node periodically randomly selects N nodes to ask if there is the latest information, and a node that has received the request replies to the requesting node with information that it has not received information recently.

In the transaction process of Hyperledger Fabric, a peer node, as a main body participating in the transaction, is mainly responsible for storing complete blockchain data and executing a smart contract. The gossip protocol can be used between the peer nodes to complete block distribution, state synchronization and other issues.

Figure 3:
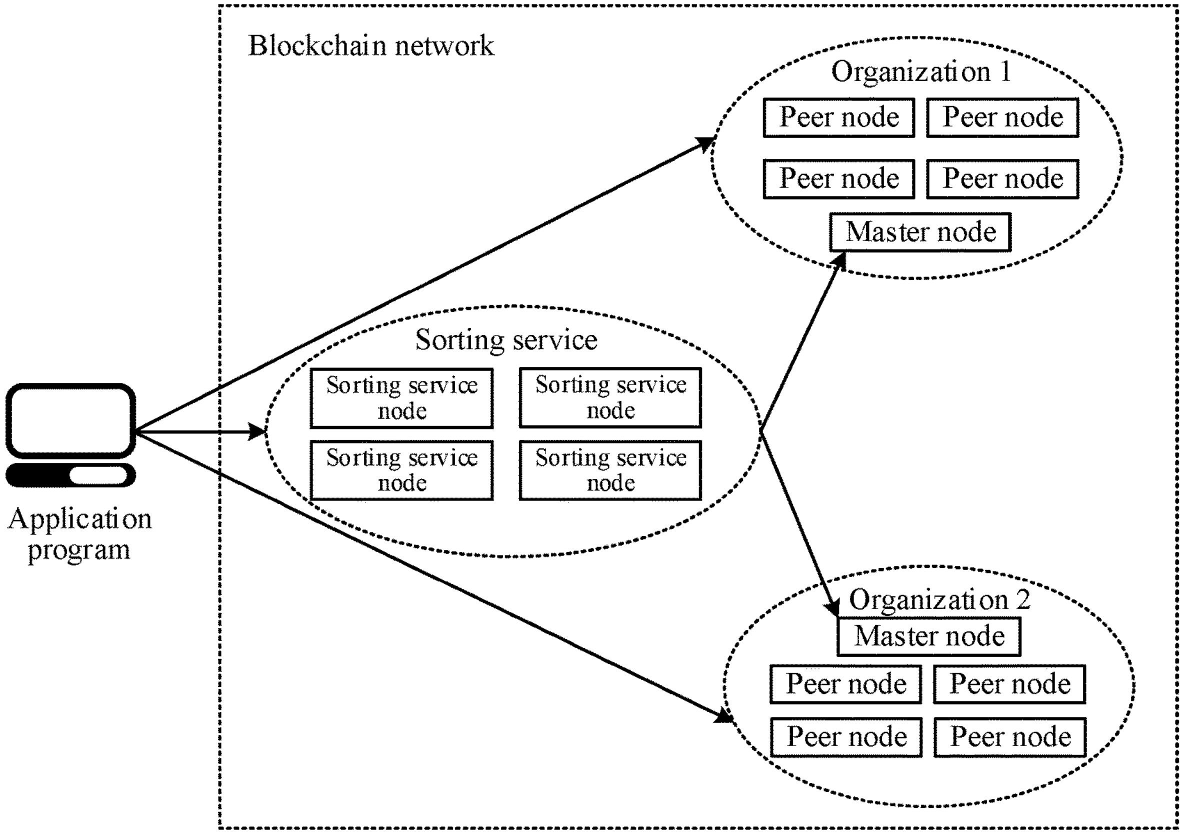
FIG. 3 illustrates the transaction process of Hyperledger Fabric.

The information of other peer nodes is maintained on each peer node, and information is exchanged randomly by communication with other peer nodes to achieve final consistency. The main process is to perform communication through a bidirectional gossip stream of a gossip client and send a signed gossip message structure. Peer nodes form a P2P network. The client will submit a request to the peer nodes, and after processing the request, the peer nodes will submit a transaction proposal to endorsers for endorsement; and the endorsers finally reach a consensus through an ordering service and broadcast to the peer nodes, as shown in FIG. 3. Gossip is responsible for connecting the ordering service to the peer nodes, which achieves efficient data distribution from a single source node to all the nodes, achieves state synchronization between different nodes in the background, and can process Byzantine problems, dynamic node addition and network partition.

Gossip Flaws:

Message delay: in the Gossip protocol, a node only randomly sends a message to a few nodes, and the message finally reaches the whole network through multiple rounds of dissemination, so the use of the Gossip protocol will cause inevitable message delay, and Gossip is not suitable for scenarios with high requirements for instantaneity.

Message redundancy: the Gossip protocol stipulates that a node will randomly periodically send messages to surrounding nodes, and the nodes that have received the message will also repeat this step, so it is inevitable that the message will be repeatedly transmitted to the same node, resulting in message redundancy; and in addition, the processing load of the nodes that have received the message also increases. Moreover, the message is transmitted periodically. Therefore, the nodes that have received the message will still receive the message, which increases the message redundancy.

The above-mentioned P2P solutions for related blockchain products are all single-layer, unified P2P, that is, node peering, which are located in the same network. However, when a blockchain product is used in some application scenarios such as the government or a commercial organization, not all blockchain participating nodes have sufficient resources and necessity to become nodes participating in blockchain consensus. For the sake of data security, when data related to personal privacy or national security is involved in a blockchain system, it is not suitable for using a general data peering P2P blockchain deployment method. It can be seen that the single-layer (i.e., node peering) P2P solution is not applicable to the above-mentioned various application scenarios. In addition, for a blockchain network that adopts a node peering P2P solution, nodes usually use a P2P routing table polling mechanism to randomly acquire desired data from other nodes, but this process usually takes a long time, which seriously affects the data acquisition efficiency.

In order to solve the above-mentioned problems, an embodiment of this disclosure provides a P2P solution based on allocation management in a layered blockchain network. By dividing blockchain networks into a witness network and a consensus network, each node may be distinguished according to different functions. On the one hand, a layered blockchain network can be achieved, and only some nodes in the blockchain network can be used as consensus nodes, which is conducive to improving the consensus efficiency. On the other hand, nodes in different networks can store different data to achieve a blockchain deployment method with data asymmetry, which can improve the security and confidentiality of data. In addition, when a service node acquires data, access nodes can be properly recommended for the service node based on recorded data storage information of each node, so that the service node can purposefully acquire requested data from the recommended access nodes, thus effectively improving the data acquisition efficiency. Based on the above-mentioned beneficial effects, the P2P solution based on allocation management in a layered blockchain network according to this embodiment of this disclosure can be applied to various application scenarios where the single-layer P2P solution is not applicable.

Figure 4:
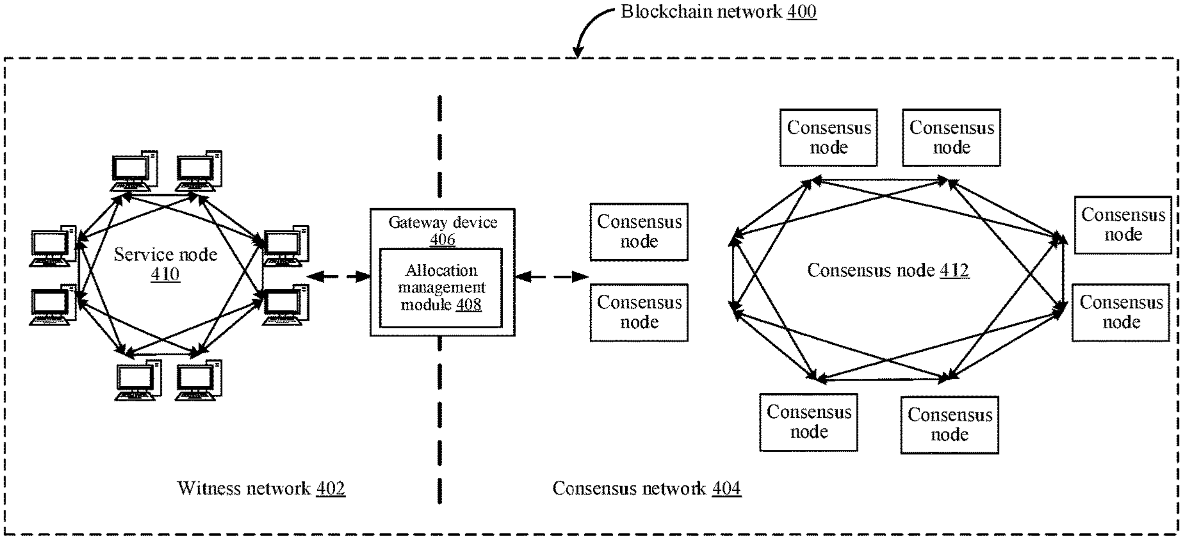
FIG. 4 is a network architecture diagram of a layered blockchain network according to an embodiment of this disclosure.

The P2P solution based on the allocation management in the layered blockchain network 400 according to this embodiment of this disclosure is described in detail below. As shown in FIG. 4, a schematic architecture diagram of a blockchain network applicable to this solution is illustrated. The blockchain network 400 is a layered blockchain network divided into a witness network 402 and a consensus network 404. The witness network 402 is composed of a plurality of service nodes 410, and the consensus network 404 is composed of a plurality of consensus nodes 412. The witness network 402 and the consensus network 404 are connected by a gateway device 406, and the gateway device 406 can also be configured with an allocation management module 408. The service nodes 410 in the witness network are SPV nodes, and the consensus nodes 412 in the consensus network are full nodes.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The service nodes 410 in the witness network 402 can store at least part of acquired data to their cache, and the at least part of data can be simultaneously stored to both the caches and internal memories of the service nodes in the witness network. Or, the at least part of data can be stored to the caches preferentially, and is then stored to the internal memories when a certain condition is satisfied (for example, a storage space is not enough at caching time and needs to be cleared). The consensus nodes 412 in the consensus network 404 store complete blockchain data (such as public data in the blockchain network and personal data related to all the service nodes) in their internal memories, can cache, according to an indication of a data cache policy, personal data related to some service nodes in the witness network to their caches, and can further update data in their caches using a Least Recently Used (LRU) algorithm. The layered blockchain network implements an asymmetric data deployment method. The data stored by the service nodes in the witness network includes public data, acquired by the service nodes, in the blockchain network, and the data stored by the consensus nodes in the consensus network includes public data in the blockchain network and personal data related to all the service nodes. Such an asymmetric data deployment method can improve the security and confidentiality of the data.

The gateway device 406 records the data storage information of at least some nodes (including the service nodes in the witness network and the consensus nodes in the consensus network) in the blockchain network 400. The data storage information includes data internal memory information and/or data cache information. The data internal memory information is used for indicating a data storage situation in the internal memories of the nodes, and the data cache information is used for indicating a data cache situation in the caches of the nodes. When making a response to a data acquisition request of a service node, the gateway device can properly recommend access nodes for the service node based on the recorded data storage information of all the nodes, so that the service node purposefully acquire the requested data from the recommended access nodes, thus effectively improving the data acquisition efficiency.

Figure 5:
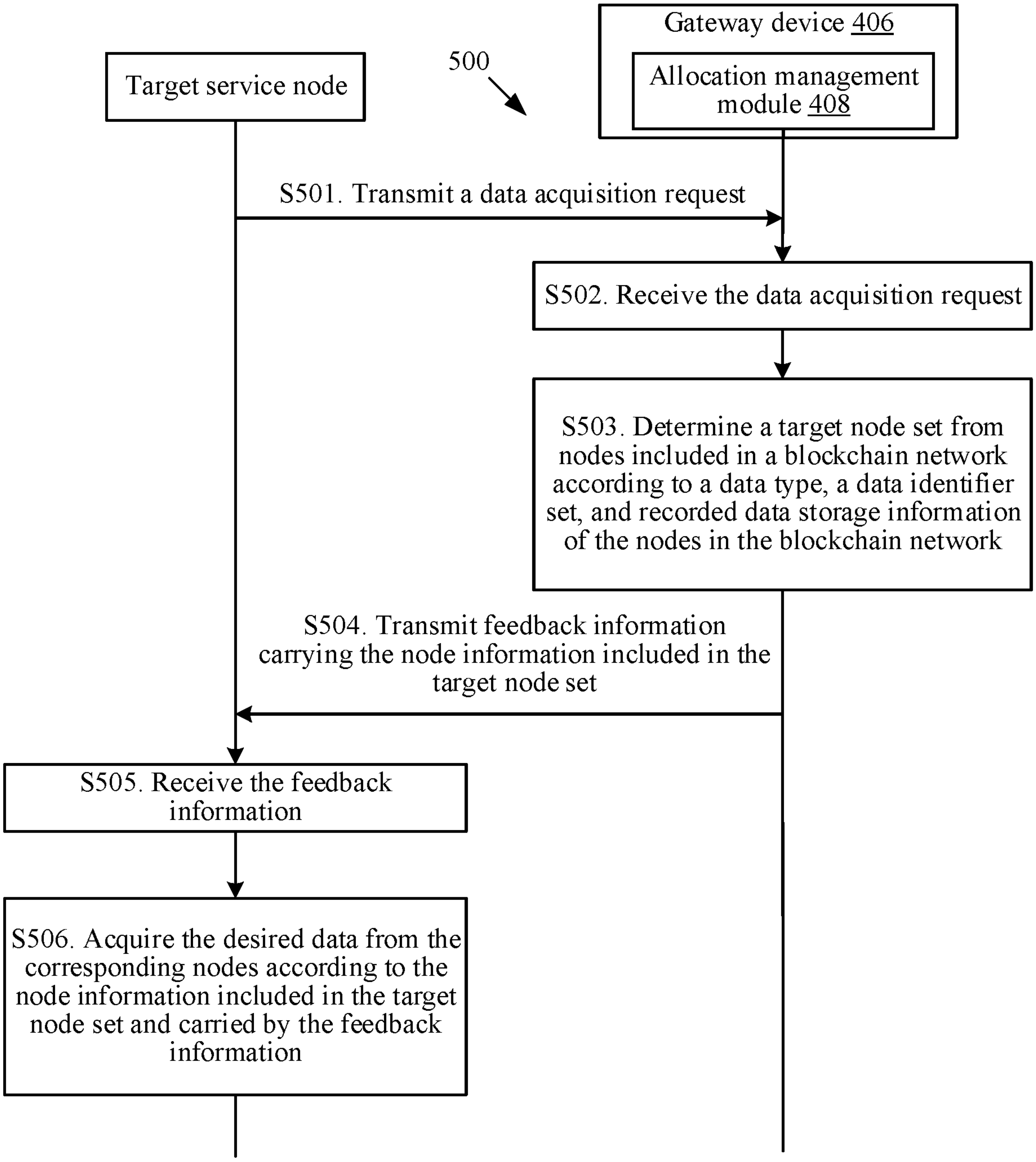
FIG. 5 is a schematic flowchart of a data processing method based on a blockchain network according to an embodiment of this disclosure.

Referring to FIG. 5, a schematic flowchart of a data processing method 500 based on a blockchain network according to an embodiment of this disclosure is illustrated. The data processing method based on a blockchain network described in this embodiment of this disclosure is implemented by the gateway device shown in FIG. 4. All or some steps implemented by the gateway device can be specifically implemented by an allocation management module configured in the gateway device. The method includes:

S501. A target service node transmits a data acquisition request to the gateway device, wherein the target service node is any service node in the witness network, and the data acquisition request carries a data type of data requested by the target service node and a data identifier set.

In this embodiment of this disclosure, the data type includes the first data type and the second data type. The first data type is a public data type. The public data is public data or data that can be accessed by any node, such as block head data. The second data type is a personal data type. Personal data is private data of a certain node, which is unpublished data or data that can only be accessed with a corresponding access permission, including transaction data in a block body and the like. The data identifier set includes one or more data identifiers, and the data identifiers are used for distinguishing data, including one or more of a height of a block to which the data belongs (if the transaction data is stored in a block with block height 100, "block height 100" is used as a data identifier of the transaction data), an identifier of an owner of the data (such as transaction data generated by service node M, "service node M" is used as a data identifier of the transaction data), generation time or uploading time of the data, and the like.

S502. The gateway device receives the data acquisition request transmitted by the target service node.

S503. In response to the data acquisition request, the gateway device determines a target node set from the nodes included in the blockchain network according to the data type, the data identifier set, and recorded data storage information of the nodes in the blockchain network.

In this embodiment of this disclosure, the service nodes in the witness network can store at least part of acquired data to their caches, and the at least part of data can be simultaneously stored to both the caches and internal memories of the service nodes in the witness network. Or, the at least part of data can be stored to the caches preferentially, and is then stored to the internal memories when a certain condition is satisfied. The consensus nodes in the consensus network store complete blockchain data in their internal memories, and can cache, according to an indication of a data cache policy, personal data related to some service nodes in the witness network to their caches. The gateway device records the data storage information of at least some nodes in the blockchain network. The data storage information includes data internal memory information and/or data cache information. The data internal memory information is used for indicating a data storage situation in the internal memories of the nodes, and the data cache information is used for indicating a data cache situation in the caches of the nodes.

The target node set determined by the gateway device from the nodes included in the blockchain network according to the data type, the data identifier set, and the recorded data storage information of the nodes in the blockchain network includes: one or more of node information determined from the service nodes in the witness network and node information determined from the consensus nodes in the consensus network. The node information includes an identifier of a node (such as a serial number of the node and a network address of the node). In a feasible implementation, the node information may also include data storage information of the node (including data cache information and/or data internal memory information), the frequency of recommendation as a node for acquiring some data, and the like. The nodes corresponding to the node information included in the target node set are one or more nodes recommended by the gateway device, from which all the data requested by the target service node can be acquired. The one or more nodes may all be service nodes in the witness network, may all be consensus nodes in the consensus network, or may be a combination of service nodes and consensus nodes.

Figure 6:
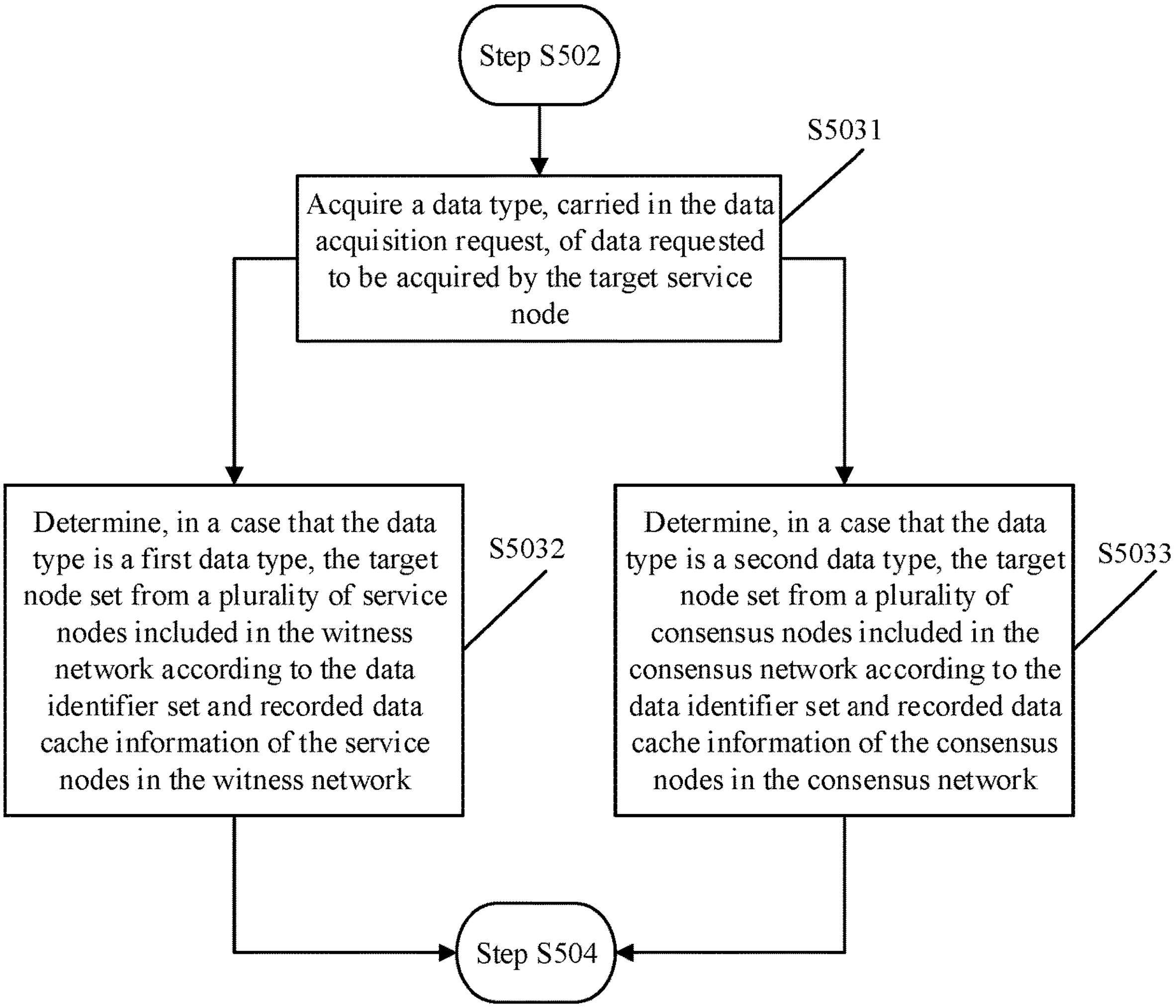
FIG. 6 is a sub-flowchart of the data processing method shown in FIG. 5.

In this embodiment of this disclosure, step S503 specifically includes the following steps as shown in FIG. 6:

S5031. The gateway device acquires the data type, carried in the data acquisition request, of the data requested by the target service node.

S5032. When the data type is the first data type, the target node set is determined from the plurality of service nodes included in the witness network according to the data identifier set and the recorded data cache information of the service nodes in the witness network, the target node set including the node information determined from the service nodes in the witness network.

Specifically, when the data type of the data requested by the target service node is the first data type, it indicates that the target service node requests public data. At this time, the gateway device determines at least one recommended node (which are all service nodes) from the plurality of service nodes included in the witness network according to the data identifier set and the recorded data cache information of the service nodes in the witness network. All the data requested by the target service node are cached in the cache of the at least one recommended node, which means: all the data requested by the target service node are cached in the cache of each recommended node; or, only part of the data requested by the target service node is cached in the cache of each recommended node, but the partial data requested by the target service node and cached by each recommended node can be combined to obtain all the data requested by the target service node; or, all the data requested by the target service node are cached in the caches of some recommended nodes, and only part of the data requested by the target service nodes are cached in the caches of some other recommended nodes.

Further, the gateway device acquires the node information of the at least one recommended node (i.e., a service node), and the node information includes the identifier of the service node (such as the serial number of the service node and the network address of the service node). In a feasible implementation, the node information may also include the data storage information of the service node (including the data cache information and/or the data internal memory information), the frequency of recommendation as a node for acquiring some data, and the like. Finally, the target node set is generated according to the node information of the at least one recommended node.

For example, the witness network includes service nodes 1, 2, and 3. The cache of service node 1 caches block header data of block heights 1-1700; the cache of service node 2 caches block header data of block heights 500-1500; and the cache of service node 3 caches block header data of block heights 3000-4500. Assuming that the target service node requests to acquire block header data of block heights 1-200, the gateway device may determine service node 1 as a recommended node, and generate the target node set according to the node information of service node 1. Assuming that the target service node requests to acquire block header data of block heights 500-1000, the gateway device may determine service nodes 1 and 2 as recommended nodes, and generate the target node set according to the node information of service nodes 1 and 2.

In one embodiment, if the gateway device determines, according to the data identifier set and the recorded data cache information of the service nodes in the witness network, that the caches of the plurality of service nodes included in the witness network do not cache all the data requested by the target service node, at least one recommended node can be determined from the plurality of service nodes included in the witness network according to the data identifier set and the recorded data internal memory information of the service nodes in the witness network, and all the data requested by the target service node are stored in the internal memory of the at least one recommended node. Various situations here are similar to those described above, and descriptions thereof are omitted.

For example, the witness network includes service nodes 1, 2, and 3, the cache of service node 1 caches the block header data of block heights 1-1700, and the internal memory stores the block header data of block heights 1-2000; the cache of service node 2 caches the block header data of block heights 500-1500, and the internal memory stores the block header data of block heights 1600-2500; and the cache of service node 3 caches the block header data of block heights 3000-4500, and the internal memory stores the block header data of block heights 3500-6000. Assuming that the target service node requests to acquire block header data of block heights 1600-2000, it can be found that the cache of service node 1 caches the block header data of block heights 1600-1700, but does not cache the block header data of block heights 1701-2000, and the caches of service nodes 2 and 3 do not cache the block header data of block heights 1600-2000; and the internal memories of service nodes 1 and 2 store the block header data of block heights 1600-2000, service node 1 and/or service node 2 can be determined as recommended nodes, and the target node set is generated according to the node information of service node 1 and/or service node 2.

In one implementation, after the gateway device determines service node 1 and/or service node 2 as the recommended nodes, and generates the target node set according to the node information of service node 1 and/or service node 2, the block header data of block heights 1600-2000 is stored in the caches of service node 1 and/or service node 2, and the recorded data cache information of service node 1 and/or service node 2 is correspondingly updated. In this way, on the one hand, when a service node in the witness network requests to acquire the block header data of block heights 1600-2000 at the later stage, the gateway device can directly determine service node 1 and/or service node 2 as the recommended nodes based on the cache information of service node 1 and/or service node 2, so that the determination efficiency of the recommended nodes and the target node set is improved; and on the other hand, when the service node in the witness network acquires the block header data of block heights 1600-2000 from service node 1 and/or service node 2, service node 1 and/or service node 2 can directly extract the block header data of block heights 1600-2000 from the caches. Compared with extraction of data from the internal memories, direct extraction from the caches is faster, which is favorable for saving network and computer resources.

In another embodiment, if the gateway device determines, according to the data identifier set and the recorded data cache information of the service nodes in the witness network, that the caches of the plurality of service nodes included in the witness network do not cache all the data requested by the target service node, at least one first recommended node and at least one second recommended node can be determined from the plurality of service nodes included in the witness network according to the data identifier set and the recorded data cache information and data internal memory information of the service nodes in the witness network. The data requested by the target service node and cached in the cache of the at least one first recommended node and the data requested by the target service node and stored in the internal memory of the at least one second recommended node can be combined to obtain all the data requested by the target service node. Further, the target node set is generated according to the node information of the at least one first recommended node and the at least one second recommended node.

For example, the witness network includes service nodes 1, 2, and 3, the cache of service node 1 caches the block header data of block heights 1-1700, and the internal memory stores the block header data of block heights 2001-3000; the cache of service node 2 caches the block header data of block heights 500-1500, and the internal memory stores the block header data of block heights 1700-2500; and the cache of service node 3 caches the block header data of block heights 3000-4500, and the internal memory stores the block header data of block heights 3500-6000. Assuming that the target service node requests to acquire block header data of block heights 1600-2000, it can be found that the cache of service node 1 caches the block header data of block heights 1600-1700, but does not cache the block header data of block heights 1701-2000, and the caches of service nodes 2 and 3 do not cache the block header data of block heights 1600-2000; and the internal memory of service node 2 stores the block header data of block heights 1701-2000, service node 1 and service node 2 can be determined as recommended nodes, and the target node set is generated according to the node information of service node 1 and service node 2.

In this embodiment of this disclosure, when the data requested by the target service node is public data, the gateway device will preferentially allocate other service nodes, which store this part of data, in the witness network to a data requester (that is, the target service node), so that the target service node acquires this part of data directly from other service nodes in the witness network, instead of the consensus network. In this way, the data acquisition speed can be increased, and the load on the consensus network can be relieved.

In a feasible embodiment, if the gateway device determines, according to the data identifier set and the recorded data storage information of the service nodes in the witness network, that the caches and internal memories of the plurality of service nodes included in the witness network do not store all the data requested by the target service node, a first recommended node set and a second recommended node set can be determined from the plurality of service nodes included in the witness network, and a third recommended node set can be determined from the plurality of consensus nodes included in the consensus network according to the data identifier set, the recorded data storage information of the service nodes in the witness network, and the recorded data storage information of the consensus nodes in the consensus network. The data requested by the target service node and cached in the caches of the first recommended nodes in the first recommended node set, the data requested by the target service node and stored in the internal memories of the second recommended nodes in the second recommended node set, and the data requested by the target service node and stored in the internal memory and/or cache of at least one third recommended node in the third recommended node set can be combined to obtain all the data requested by the target service node. Further, the target node set is generated according to the node information of the first recommended nodes in the first recommended node set, the second recommended nodes in the second recommended node set, and the at least one third recommended node in the third recommended node set. In addition to including the identifiers of the nodes, the node information can also include the data storage information of the nodes. The first recommended node set and/or the second recommended node set may be empty sets.

In a feasible embodiment, when the gateway device determines the target node set from the plurality of service nodes included in the witness network according to the data identifier set and the recorded data storage information of the service nodes in the witness network, the target node set can be further determined in combination with recorded network performance parameters of the service nodes in the witness network, and/or the frequency of recommendation as a node for acquiring some data. The network performance parameters include one or more of a rate, a bandwidth, a delay (including a transmission delay, a dissemination delay, a processing delay, and a queuing delay), a bandwidth delay product, a utilization rate (including a channel utilization rate and a network utilization rate), a throughput, and a load condition.

For example, the witness network includes service nodes 1 and 2, the cache of service node 1 caches the block header data of block heights 1-1700, and the cache of service node 2 caches the block header data of block heights 500-1500.

Assuming that the target service node requests to acquire the block header data of block heights 1000-1500, it can be found that the caches of service nodes 1 and 2 both cache the block header data of block heights 1000-1500; and If it is determined, based on the network performance parameters of service nodes 1 and 2, that the network performances of service node 1 are better than those of service node 2, service node 1 can be determined as a recommended node, and the target node set is generated according to the node information of service node 1.

S5033. When the data type is the second data type, the target node set is determined from the plurality of consensus nodes included in the consensus network according to the data identifier set and the data cache information of the consensus nodes in the consensus network, the target node set including the node information determined from the consensus nodes in the consensus network.

Specifically, when the data type of the data requested by the target service node is the second data type, it indicates that the target service node requests personal data. The gateway device determines at least one recommended node (which are all consensus nodes) from the plurality of consensus nodes included in the consensus network according to the data identifier set and the recorded data cache information of the consensus nodes in the consensus network. All the data requested by the target service node are cached in the cache of the at least one recommended node. Various situations here are similar to those described above, and descriptions thereof are omitted.

Further, the node information of the at least one recommended node (i.e., a consensus node) is acquired, and the node information includes the identifier of the consensus node (such as the serial number of the consensus node and the network address of the consensus node). In a feasible implementation, the node information may also include the data cache information of the consensus node. Finally, the target node set is generated according to the node information of the at least one recommended node.

For example, the consensus network includes consensus nodes 1, 2, and 3, the cache of consensus node 1 caches transaction data generated by service node 1 within a first time period; the cache of consensus node 2 caches transaction data generated by service node 2 within the first time period; and the cache of consensus node 3 caches transaction data generated by service nodes 1 and 2 within a second time period. Assuming that the target service node is service node 1, and requests to acquire the transaction data (personal data of service node 1) generated within the first time period, the gateway device can determine consensus node 1 as a recommended node, and generate the target node set according to the node information of consensus node 1.

If the gateway device determines, according to the data identifier set and the recorded data cache information of the consensus nodes in the consensus network, that the caches of the plurality of consensus nodes included in the consensus network do not cache all the personal data requested by the target service node, since the internal memories of the consensus nodes in the consensus network all store complete blockchain data, at least one consensus node can be randomly added into a recommended node set, and the target service node acquires all the requested data from the at least one consensus node or acquires the requested data that is not cached in the cache of the consensus node. In a feasible implementation, the gateway device may also add at least one consensus node into the recommended node set in combination with recorded network performance parameters of the consensus nodes in the consensus network. For example, a consensus node with the best network performances is also used as a recommended node, and the target service node can acquire all the requested data from the consensus node with the best network performances or acquire the requested data that is not cached in the cache of the consensus node.

In one embodiment, when the target service node requests to acquire personal data, identity authentication information of the target service node can be carried in the data acquisition request and transmitted to the gateway device. The identity authentication information may include one or more of a node identifier, a public key password, a public key certificate and the like. When the gateway device detects that the target service node requests to acquire the personal data, the gateway device can first perform identity authentication on the target service node according to the identity authentication information of the target service node carried in the data acquisition request, including one or more of verifying whether the target service node is a service node in the witness network according to the node identifier, verifying the accuracy of the public key password, verifying the accuracy of the public key certificate, and the like. When an identity authentication result indicates that the identity authentication of the target service node succeeds, whether the target service node has a permission to acquire the requested personal data is further determined according to the data identifier set and recorded data authorization information on the target service node; and if the target service node has the permission, the target node set is determined from the plurality of consensus nodes included in the consensus network according to the data identifier set and the recorded data cache information of the consensus nodes in the consensus network. Otherwise, if the target service node does not have the permission, the data acquisition request of the target service node is rejected. In this way, the security of data acquired from the consensus network can be improved to a certain extent.

All the steps in S103 may be specifically implemented by the allocation management module configured in the gateway device.

In one embodiment, after receiving the data acquisition request transmitted by the target service node, the gateway device first detects whether the allocation management module configured in the gateway device runs normally; and if the allocation management module runs normally, the gateway device triggers the allocation management module to implement S103:determine the target node set from the nodes included in the blockchain network according to the data type, the data identifier set, and the recorded data storage information of the nodes in the blockchain network; and if the allocation management module runs abnormally, the gateway device makes, according to a P2P routing table pooling policy, a response to the data acquisition request transmitted by the target service node, so that the target service node randomly acquires the requested data from other nodes.

S504. The gateway device transmits feedback information carrying the node information included in the target node set to the target service node.

In this embodiment of this disclosure, the feedback information is used for instructing the target service node to acquire the requested data from the corresponding nodes according to the node information included in the target node set.

In one embodiment, when the target node set includes the node information of a plurality of nodes, the feedback information may also carry a data acquisition policy, and the data acquisition policy is used for instructing the target service node to acquire which part of data from which node. The data acquisition policy may be determined by the gateway device according to the data storage information and network performance parameters of the nodes in the blockchain network.

S505. The target service node receives the feedback information transmitted by the gateway device.

S506. The target service node acquires the requested data from the corresponding nodes according to the node information included in the target node set and carried in the feedback information.

In this embodiment of this disclosure, the target service node determines, according to the node information included in the target node set, access nodes (one or more) from at least one recommended node corresponding to the node information included in the target node set, determines at least part of corresponding data needing to be acquired from the various access nodes, and accesses the various access nodes to acquire the at least part of corresponding data, so as to obtain all the data requested by the target service node. The target service node may further determine the access nodes and the at least part of corresponding data needing to be acquired from the various access nodes by combining the node information included in the target node set and one or more of network performance parameters, geographical location parameters, and the frequency of recommendation as a node for acquiring some data of the various recommended nodes corresponding to the node information included in the target node set.

In one embodiment, if the target node set includes the node information of a plurality of nodes, and the feedback information also carries a data acquisition policy, the target service node can determine the corresponding nodes as access nodes according to an indication of the data acquisition policy, and acquire the corresponding part of data from the corresponding access nodes according to an indication of the data acquisition policy.

In the above-mentioned manner, when the node information included in the target node set corresponds to a plurality of nodes, if the plurality of nodes only include part of the data requested by the target service node, a plurality of access nodes are determined, which ensures that all the requested data are acquired; if the plurality of nodes all include all the data requested by the target service node, a plurality of access nodes are determined, and part of data is acquired from the various access nodes, which can reduce a load on each access node based on ensuring that all the requested data are acquired, so as to equalize a network load, increase the success rate of data transmission, and improve the data acquisition speed.

In a feasible embodiment, if the node information included in the target node set further includes the data storage information of each recommended node, before the requested data is acquired from the corresponding nodes according to the node information included in the target node set, whether each recommended node stores the data requested by the target service node is first determined according to the data storage information of each recommended node; if YES, the requested data is acquired from the corresponding nodes according to the node information included in the target node set; otherwise, if NO, it indicates that the data in the data acquisition request is likely to be maliciously tampered with. At this time, an encrypted data acquisition request (if the request is encrypted using a private key of the service node, the gateway device decrypts the request using a corresponding stored public key) can be re-transmitted to the gateway device, so as to acquire new recommended nodes. In this ways, there is no need to acquire data from wrong nodes, and time and network resources can be saved.

The data acquisition process involved in the data processing method based on a blockchain network according to this embodiment of this disclosure has been described in detail above. Other data processing processes involved in the data processing method based on a blockchain network are described below.

1. Data Caching of Consensus Nodes:

The consensus nodes can cache data in their caches based on a data cache policy. Specifically, the gateway device determines the data cache policy on the consensus nodes in the consensus network. The data cache policy is used for instructing the consensus nodes in the consensus network to cache at least some data related to some service nodes in the witness network. The data cache policy may be determined based on the number, the network performance parameters, and the frequency of recommendation as a node for acquiring some data of the consensus nodes in the consensus network. The gateway device generates a data cache request according to the data cache policy, and transmits the data cache request to the consensus nodes in the consensus network. After receiving the data cache request, the consensus nodes in the consensus network cache, in response to the data cache request, at least part of the data related to some service nodes in the witness network according to an indication of the data cache policy, so that the service nodes in the witness network access the personal data from the consensus nodes.

In the process of updating their own caches, the consensus nodes can update the data in their own caches using an LRU mode, or can update the data in their own caches according to an indication of a new data cache policy determined by the gateway device.

The steps, involved in the above process, of determining a data cache policy and generating a data cache request according to the data cache policy may be specifically implemented by the allocation management module configured in the gateway device.

2. Data Synchronization of Service Nodes:

The data synchronization of the service node includes: synchronizing own data storage information to the gateway device, and synchronizing own network performance parameters to the gateway device, and the like. Specifically, a service node in the witness network determines a stored data update information, and the stored data update information may include: one or more of related information of the data currently stored in the internal memory, related information of the data currently cached in the cache, data adjustment information in the internal memory, and data adjustment information in the cache. The data adjustment information includes related information of added data and related information of cleared data. The related information may be the data itself, or characteristic information such as the identifier of the data.

A service node in the witness network transmits a data synchronization request carrying the stored data update information to the gateway device, and the gateway device updates, in response to the data synchronization request, the recorded data storage information of the service node based on the stored data update information.

In one embodiment, a service node in the witness network may carry its current network performance parameters to the data synchronization request and transmit the same to the gateway device, and the gateway device can update the recorded network performance parameters of the corresponding service node based on the network performance parameters carried in the data synchronization request. The gateway device may also acquire the current network performance parameters of the service node in the witness network at a preset time interval, and update the recorded network performance parameters of the corresponding service node based on the acquired current network performance parameters.

The updated data storage information and network performance parameters of each service node are used as an important reference for the gateway device to recommend, in response to the data acquisition request of the service node, data access nodes for the service node at the later stage. All the steps, implemented by the gateway device, in the above process may be specifically implemented by the allocation management module configured in the gateway device.

3. Data Uploading of Service Nodes:

After generating transaction data, a service node in the witness network generates a data upload request carrying the transaction data and sends the data upload request to the gateway device. The gateway device transmits, in response to the data upload request, the transaction data to a current master node in the consensus network. The master node generates a block according to the transaction data and broadcasts the block to the consensus nodes in the consensus network, so that the consensus nodes in the consensus network reach a consensus on the transaction data in the block, and upload the block after the consensus succeeds.

In a feasible embodiment, the gateway device can generate, in response to the data upload request, a block according to the transaction data, and broadcasts the block to the various consensus nodes in the consensus network, so that the consensus nodes in the consensus network reach a consensus on the transaction data in the block, and upload the block after the consensus succeeds. In this way, the gateway device can be used as a block production node in the process of uploading the transaction data, without selecting a block production node (i.e., a master node) from the consensus nodes in the consensus network, so that the data processing volume of the consensus nodes can be reduced, and the problem of a consensus mistake or failure caused by a failure of selection of the block production node, a mistake and other reasons can also be avoided.

In a specific implementation of the data processing method based on a blockchain network according to this embodiment of this disclosure, when interacting with each other for various data, the nodes and the gateway device can both encrypt data for interaction and transmit the data to the other parties. In this way, the security of data interaction can be improved. The encryption can be performed using the own private key or the public key of the other party, and the other party can decrypt the encrypted data using the corresponding public key or private key.

Based on the foregoing introduction, a main implementation of the P2P solution based on allocation management in the layered blockchain network according to this embodiment of this disclosure is as follows:

A blockchain is divided into a witness network and a consensus network, the witness network is formed by networking a plurality of service nodes, and the consensus network is formed by networking a plurality of consensus nodes. The service nodes in the witness network mainly perform business execution, without participating in accounting consensus, and can acquire the block header data and some block data authorized to be read from the consensus network by identity authentication. As shown in FIG. 4, an overall network architecture of the layered blockchain network is illustrated. The witness network and the consensus network are connected through the gateway device (that is, the service nodes and the consensus nodes interact through the gateway device), and the gateway device is provided with the allocation management module (or a P2P tracker that is an allocation management tool). The witness network and the consensus network are located in different network environments. The witness network is located in a public network, and the consensus network is located in a private network. Since the consensus network is located in a relatively secure private network, and there is a consensus mechanism for mutual access between the consensus nodes to ensure the security, additional identity management and network control are usually not required. The service nodes are in the public network and may be accessed by other uncertain network terminals. Therefore, the behavior that the service nodes and other possible nodes access the consensus network needs to be strictly controlled.

Figure 7:
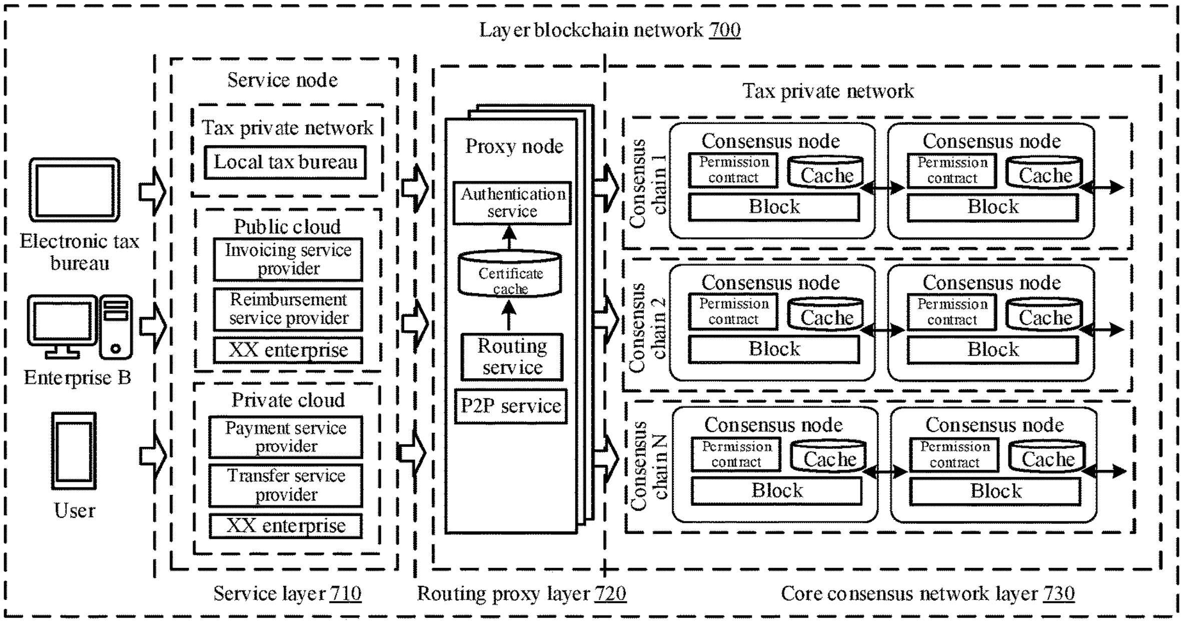
FIG. 7 is a network architecture diagram of another layered blockchain network according to an embodiment of this disclosure.

As shown in FIG. 7, a specific network architecture of the layered blockchain network 700 applied to an electronic invoice business application scenario is illustrated. A service layer 710 is located in the witness network and will submit a business operation interaction to a core consensus network layer. The service layer 710, a routing proxy layer 720, and the core consensus network layer 730 form the entire blockchain service system. The routing proxy layer 720 plays a role in isolating the service layer 710 from the core consensus network layer 730, and the gateway device in the layered blockchain network can be configured in the routing proxy layer 720. The gateway device may be a proxy node shown in FIG. 7, or configured in a proxy node shown in FIG. 7.

In the above layered blockchain network, the data acquired by a service node in the witness network from other nodes include: public data in the blockchain network (such as the block header data) and personal data of the service node (such as the transaction data of the service node).

When a service node in the witness network acquires the public data, the P2P tracker will preferentially allocate other service nodes having this part of public data to a data requester, so as to relieve the load on the consensus network. The P2P tracker records which part of data that each service node currently has. After the service node obtains a certain part of data, the service node will preferentially put the data to the cache.

In this way, assuming that service node A requests block header data of block heights 1-1000, service node A preferentially applies for the block header data from the P2P tracker. If the P2P tracker recommends service node B for service node A, service node A will acquire the desired block header data of block heights 1-1000 from service node B, and the P2P tracker will mark a cache of service node A that currently has the block header data of block heights 1-1000. Assuming that service node C request block header data of block heights of 500-1000 at the later stage, the P2P tracker can recommend service node A and service node B for service node Assuming that there are more service nodes requesting the block header data of block heights 500-1000 at the later stage, the P2P tracker will uniformly recommend service nodes A, B, and C for the data requesters to ensure balanced network traffic.

Assuming that there is service node X requesting block header data of block heights 3000-4000, if all the service nodes do not cache this part of data, the P2P tracker can randomly recommend service node B that stores this part of data in the internal memory, service node X acquires the desired block header data of block heights 3000-4000 from service node B. Then, both service nodes X and B cache the block header data of block heights 3000-4000, so that at the later stage, the frequency of recommending acquisition of the block header data of block heights 3000-4000 from service node B can be increased, and the frequency of recommending acquisition of the block header data of block heights 1-1000 from service node B can be decreased.

When a service node in the witness network acquires the personal data, since other service nodes do not store this part of personal data, the P2P tracker will allocate consensus nodes that have cached this part of personal data to the data requester, so that the data requester acquires the desired personal data directly from the caches of the allocated consensus nodes. Compared with acquisition of the data from an internal memory, acquisition from a cache is faster, and the data acquisition efficiency is higher. The consensus nodes in the consensus network will update their own caches using the LRU mode according to the request allocated by the P2P tracker, finally achieving that each consensus node uses less cache to provide data more efficiently. The P2P tracker can dynamically adjust the allocation frequency according to the number of consensus nodes.

A service node in the witness network and/or a consensus node in the consensus network can report its current data status and current network performances to the P2P tracker, so that the P2P tracker updates the recorded data storage information of the node, which is conductive to ensuring the accuracy of access nodes allocated to the data requester. When allocating an access node to a data requester, the P2P tracker can allocate the access node based on the following parameters of each node: a data storage status, the network performance, and a frequency of recommendation as a node for acquiring some data.

In addition, the layered blockchain network can also run without the P2P tracker. When there is no P2P tracker or the P2P tracker fails, the P2P routing table polling mechanism can be used. A data requester randomly requests desired data from other nodes. In this way, although the performance will decrease, the security of the data in the layered blockchain network can be still guaranteed. A plurality of P2P trackers may also be configured. When the default P2P tracker fails, P2P tracker can be switched according to a preset priority order to ensure normal running.

This embodiment of this disclosure provides a P2P solution suitable for a layered blockchain network. Compared with an original P2P autonomous connection mode, this P2P solution adds a P2P tracker into the layered blockchain network, and achieves a data cache and traffic planning method based on a layered blockchain network. The P2P solution based on allocation management in a layered blockchain network according to this embodiment of this disclosure not only achieves an asymmetric data blockchain deployment mode, but also improves the security and confidentiality of data. Furthermore, when a service node acquires data, access nodes can be properly recommended for the service node based on the recorded data storage information of each node, so that the service node can purposefully acquire requested data from the recommended access nodes, thus effectively improving the data acquisition efficiency. Based on the above-mentioned beneficial effects, the P2P solution based on allocation management in a layered blockchain network according to this embodiment of this disclosure can be applied to various application scenarios where the single-layer P2P solution is not applicable.

An implementation main body for implementing each step in the above method embodiments may be constituted by hardware or software, or may be constituted by a combination of software and hardware.

Figure 8:
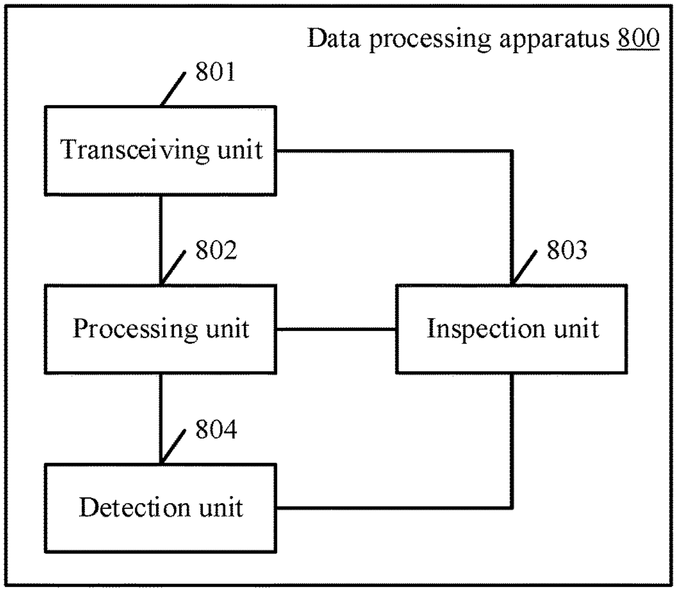
FIG. 8 is a schematic structural diagram of a data processing apparatus based on a blockchain network according to an embodiment of this disclosure.

Referring to FIG. 8, a schematic structural diagram of a data processing apparatus 800 based on a blockchain network according to an embodiment of this disclosure is illustrated. The data processing apparatus based on a blockchain network according to this embodiment of this disclosure corresponds to the foregoing gateway device. The blockchain network includes a witness network and a consensus network, the witness network is formed by networking a plurality of service nodes, the consensus network is formed by networking a plurality of consensus nodes, and the witness network and the consensus network are connected through a gateway device. The apparatus includes:

a transceiving unit 801, configured to receive a data acquisition request transmitted by a target service node, the data acquisition request carrying a data type of data requested by the target service node and a data identifier set; and a processing unit 802, configured to determine a target node set from nodes included in the blockchain network according to the data type, the data identifier set, and recorded data storage information of the nodes in the blockchain network. The target node set includes one or more of node information determined from service nodes in the witness network and node information determined from consensus nodes in the consensus network.

The transceiving unit 801 is further configured to transmit feedback information carrying the node information included in the target node set to the target service node, the feedback information being used for instructing the target service node to acquire the requested data from the corresponding nodes according to the node information included in the target node set.

In one embodiment, the data storage information includes data cache information, and the processing unit 802 is further configured to: determine, when the data type is a first data type, a target node set from the plurality of service nodes included in the witness network according to the data identifier set and recorded data cache information of the service nodes in the witness network, the target node set including the node information determined from the service nodes in the witness network.

In one embodiment, the processing unit 802 is further configured to: determine the target node set from the plurality of service nodes included in the witness network according to the data identifier set and recorded data cache information and network performance parameters of the service nodes in the witness network.

In one embodiment, the processing unit 802 is further configured to: determine, when the data type is a second data type, the target node set from a plurality of consensus nodes included in the consensus network according to the data identifier set and recorded data cache information of the consensus nodes in the consensus network, the target node set including the node information determined from the consensus nodes of the consensus network.

In one embodiment, the data acquisition request also carries identity authentication information of the target service node when the data type is the second data type. The apparatus further includes an inspection unit 803 configured to:

perform identity authentication on the target service node according to the identity authentication information; determine, according to the data identifier set and recorded data authorization information on the target service node when an identity authentication result indicates that the identity authentication of the target service node succeeds, whether the target service node has a permission to acquire the data requested by the target service node; and trigger, when the target service node has the permission, the processing unit 802 to determine, according to the data identifier set and recorded data cache information of the consensus nodes in the consensus network, the target node set from the plurality of consensus nodes included in the consensus network.

In one embodiment, the processing unit 802 is also configured to determine a data cache policy on the consensus nodes in the consensus network, and generate a data cache request according to the data cache policy.

The transceiving unit 801 is also configured to transmit the data cache request to the consensus nodes in the consensus network to enable the consensus nodes in the consensus network to cache data related to some service nodes in the witness network according to an indication of the data cache policy.

In one embodiment, the apparatus further includes a detection unit 804 configured to:

detect whether an allocation management module runs normally; trigger, when the allocation management module runs normally, the allocation management module to determine, according to the data type, the data identifier set and the recorded data storage information of the nodes in the blockchain network, the target node set from the nodes included in the blockchain network; and trigger, when the allocation management module runs abnormally, the processing unit 802 to make, according to a P2P routing table polling policy, a response to the data acquisition request transmitted by the target service node.

In one embodiment, the transceiving unit 801 is also configured to receive a data synchronization request transmitted by the target service node, the data synchronization request carrying stored data update information of the target service node.

The processing unit 802 is also configured to update the recorded data storage information of the target service node based on the stored data update information.

In one embodiment, the processing unit 802 is also configured to: update, when the data synchronization request carries network performance parameters of the target service node, recorded network performance parameters of the target service node based on the network performance parameters carried in the data synchronization request; and/or, acquire current network performance parameters of the target service node every preset time interval, and update, based on the acquired current network performance parameters, the recorded network performance parameters of the target service node.

It can be understood that functions of all functional units of the data processing apparatus according to this embodiment of this disclosure may be specifically implemented according to the methods in the foregoing method embodiments. For specific implementation processes, reference may be made to related descriptions for the foregoing method embodiments.

In a feasible implementation, the data processing apparatus based on a blockchain network according to this embodiment of this disclosure can be implemented in the form of software. The data processing apparatus based on a blockchain network may be stored in a memory, which may be software such as a program and a plugin and includes a series of units: a transceiving unit, a processing unit, an inspection unit, and a detection unit. The transceiving unit, the processing unit, the inspection unit, and the detection unit are configured to implement the data processing method based on a blockchain network according to this embodiment of this disclosure.

In other feasible embodiments, the data processing apparatus based on a blockchain network according to this embodiment of this disclosure may also be implemented in the form of combining software and hardware. For example, the data processing apparatus based on a blockchain network according to this embodiment of this disclosure may be a processor in a form of a hardware decoding processor, programmed to perform the data processing method based on a blockchain network according to this embodiment of this disclosure. For example, the processor in the form of a hardware decoding processor may use one or more application-specific integrated circuits (ASICs), a DSP, a programmable logic device (PLD), a complex programmable logic device (CPLD), a field-programmable gate array (FPGA), or other electronic components.

In this embodiment of this disclosure, by dividing the blockchain network into a witness network and a consensus network, each node may be distinguished according to different functions. On the one hand, a layered blockchain network can be achieved, and only some nodes in the blockchain network can be used as consensus nodes, which is conducive to improving the consensus efficiency. On the other hand, nodes in different networks can store different data to achieve a blockchain deployment method with data asymmetry, which can improve the security and confidentiality of data. In addition, when a service node acquires data, access nodes can be properly recommended (or allocated) for the service node based on recorded data storage information of each node, so that the service node can purposefully acquire requested data from the recommended access nodes, thus effectively improving the data acquisition efficiency. Based on all the above-mentioned aspects, this embodiment of this disclosure achieves a P2P solution based on allocation management in a layered blockchain network, which can be applied to various application scenarios where the single-layer P2P solution is not applicable.

Figure 9:
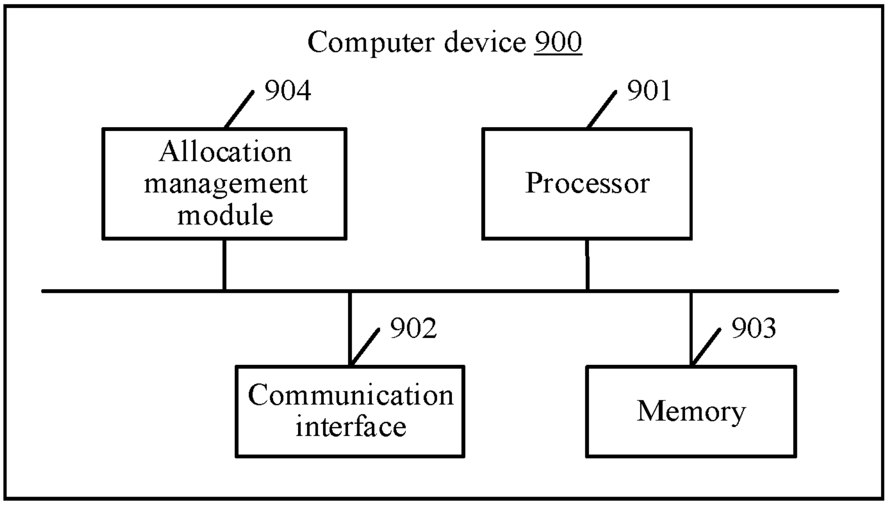
FIG. 9 is a schematic structural diagram of a computer device according to an embodiment of this disclosure.

Referring to FIG. 9, a schematic structural diagram of a computer device 900 according to an embodiment of this disclosure is illustrated. The computer device 900 described in this embodiment of this disclosure correspond to the aforementioned gateway device, including: a processor 901, a communications interface 902, a memory 903, and an allocation management module 904. The processor 901, the communication interface 902, the memory 903, and the allocation management module 904 may be connected via bus or in other ways. In this embodiment of this disclosure, bus connection is taken as an example.

The processor 901 (or referred to as central processing unit (CPU)) is a computing core and control core of the computer device, and may parse various kinds of instructions in the computer device and process all kinds of data of the computer device. For example: the CPU may be configured to parse an on/off instruction transmitted by a user to the computer device and control the computer device to perform a switch on/off operation. In another example: the CPU may transmit all kinds of interaction data and the like between internal structures of the computer device. The communication interface 902 may include standard wired interface and a standard wireless interface (such as Wi-Fi and mobile communication interfaces), and is controlled by the processor 901 to be configured to transmit and receive data. The memory 903 is a storage device in the computer device, and is configured to store a program and data. It is understood that the memory 903 here may include an internal memory of the computer device, and may also certainly include an expanded memory supported by the computer device. The memory 903 provides a storage space which stores an operating system of the computer device and may include but not limited to: an Android system, an iOS system, a Windows Phone system and the like. This disclosure does not limit to this. The allocation management module 904 is configured to implement some particular functions of the computer device.

In this embodiment of this disclosure, the computer device is arranged in a blockchain network; the blockchain network includes a witness network and a consensus network, the witness network is formed by networking a plurality of service nodes, and the consensus network is formed by networking a plurality of consensus nodes; and the witness network and the consensus network are connected through a gateway device. The processor 901 performs the following operations by running executable program codes in the memory 903:

receiving, through the communication interface 902, a data acquisition request transmitted by a target service node, the data acquisition request carrying a data type of data requested by the target service node and a data identifier set; determining a target node set from the nodes included in the blockchain network according to the data type, the data identifier set, and recorded data storage information of the nodes in the blockchain network, the target node set including one or more of node information determined from the service nodes in the witness network and node information determined from the consensus nodes in the consensus network; and transmitting, through the communication interface 902, feedback information carrying the node information included in the target node set to the target service node, the feedback information being used for instructing the target service node to acquire the requested data from the corresponding nodes according to the node information included in the target node set.

In one embodiment, the data storage information includes data cache information; and when determining the target node set from the nodes included in the blockchain network according to the data type, the data identifier set, and the recorded data storage information of the nodes in the blockchain network, the processor 901 is further configured to:

determine, when the data type is the first data type, the target node set from the plurality of service nodes included in the witness network according to the data identifier set and recorded data cache information of the service nodes in the witness network, the target node set including the node information determined from the service nodes in the witness network; and determine, when the data type is a second data type, the target node set from a plurality of consensus nodes included in the consensus network according to the data identifier set and recorded data cache information of the consensus nodes in the consensus network, the target node set including the node information determined from the consensus nodes of the consensus network.

In one embodiment, when determining the target node set from the plurality of service nodes included in the witness network according to the data identifier set and the recorded data cache information of the service nodes in the witness network, the processor 901 is further configured to: determine a target node set from the plurality of service nodes included in the witness network according to the data identifier set and recorded data cache information and network performance parameters of the service nodes in the witness network.

In one embodiment, the data acquisition request also carries identity authentication information of the target service node when the data type is the second data type. Before determining the target node set from the plurality of consensus nodes included in the consensus network according to the data identifier set and the recorded data cache information of the consensus nodes in the consensus network, the processor 901 is also configured to:

perform identity authentication on the target service node according to the identity authentication information; determine, according to the data identifier set and recorded data authorization information on the target service node when an identity authentication result indicates that the identity authentication of the target service node succeeds, whether the target service node has a permission to acquire the data requested by the target service node; and determine, when the target service node has the permission, the target node set from the plurality of consensus nodes included in the consensus network according to the data identifier set and the recorded data cache information of the consensus nodes in the consensus network.

In one embodiment, the processor 901 is also configured to: determine a data cache policy on the consensus nodes in the consensus network, and generate a data cache request according to the data cache policy; and transmit, through the communication interface 902, the data cache request to the consensus nodes in the consensus network to enable the consensus nodes in the consensus network to cache, according to an indication of the data cache policy, data related to some service nodes in the witness network.

In one embodiment, before determining the target node set from the nodes included in the blockchain network according to the data type, the data identifier set, and the recorded data storage information of the nodes in the blockchain network, the processor 901 is also configured to:

detect whether the allocation management module 904 runs normally; trigger, when the allocation management module 904 runs normally, the allocation management module 904 to determine, according to the data type, the data identifier set, and the recorded data storage information of the nodes in the blockchain network, the target node set from the nodes included in the blockchain network; and make, according to a P2P routing table polling policy when the allocation management module runs abnormally, a response to the data acquisition request transmitted by the target service node.

In one embodiment, the processor 901 is also configured to: receive, through the communication interface 902, a data synchronization request transmitted by the target service node, the data synchronization request carrying stored data update information of the target service node; and update recorded data storage information of the target service node based on the stored data update information.

In one embodiment, the processor 901 is also configured to: update, when the data synchronization request carries network performance parameters of the target service node, recorded network performance parameters of the target service node based on the network performance parameter carried by the data synchronization request; and/or, acquire current network performance parameters of the target service node every preset time interval, and update, based on the acquired current network performance parameters, the recorded network performance parameters of the target service node.

In a specific implementation, the processor 901, the communication interface 902, the memory 903, and the allocation management module 904 described in this embodiment of this disclosure can implement the gateway device described in the data processing method based on a blockchain network according to this embodiment of this disclosure, and can also implement the data processing apparatus based on a blockchain network according to this embodiment of this disclosure. Descriptions thereof are omitted here.

In this embodiment of this disclosure, by dividing the blockchain network into a witness network and a consensus network, each node may be distinguished according to different functions. On the one hand, a layered blockchain network can be achieved, and only some nodes in the blockchain network can be used as consensus nodes, which is conducive to improving the consensus efficiency. On the other hand, nodes in different networks can store different data to achieve a blockchain deployment method with data asymmetry, which can improve the security and confidentiality of data. In addition, when a service node acquires data, access nodes can be properly recommended for the service node based on recorded data storage information of each node, so that the service node can purposefully acquire requested data from the recommended access nodes, thus effectively improving the data acquisition efficiency. Based on all the above-mentioned aspects, this embodiment of this disclosure achieves a P2P solution based on allocation management in a layered blockchain network, which can be applied to various application scenarios where the single-layer P2P solution is not applicable.

An embodiment of this disclosure further provides a computer-readable storage medium, storing instructions, the instructions, when run on a computer, causing the computer to implement the data processing method based on a blockchain network according to this embodiment of this disclosure. For a specific implementation, reference may be made to the foregoing descriptions in other embodiments.

An embodiment of this disclosure provides a computer program product or a computer program. The computer program product or the computer program includes computer instructions, and the computer instructions are stored in a computer readable storage medium. A processor of a computer device reads the computer instruction from the computer readable storage medium, and the processor executes the computer instruction, so that the computer device implements the data processing method based on a blockchain network according to this embodiment of this disclosure. For a specific implementation, reference may be made to the foregoing descriptions in other embodiments.

For ease of description in the foregoing method embodiments, each method is described as a combination of a series of operations. However, a person skilled in the art understands that this disclosure is not limited to the order of the described operations because some steps according to this disclosure may occur in other order or occur in parallel. In addition, a person skilled in the art is also to learn that the embodiments described in this specification are all exemplary embodiments, and the involved actions and modules are not necessarily required to this disclosure.

A person of ordinary skill in the art may understand that all or some of the steps of the various methods in the foregoing embodiments may be implemented by a program instructing relevant hardware. The program may be stored in a computer-readable storage medium. The storage medium may include: a flash drive, a Read-Only Memory (ROM), a Random Access Memory (RAM), a magnetic disk, an optical disc, and the like.

The foregoing disclosure is merely some embodiments of this disclosure, and certainly is not intended to limit the protection scope of this disclosure. Therefore, equivalent variations made in accordance with the claims of this disclosure shall fall within the scope of this disclosure.

What is claimed is:

1. A data processing method based on a blockchain network, the blockchain network comprising a witness network and a consensus network, the witness network being located in a public network and formed by networking a plurality of service nodes, the consensus network being located in a private network and formed by networking a plurality of consensus nodes, the witness network and the consensus network being connected by a gateway device, the plurality of services nodes storing public data in the blockchain network, the plurality of consensus nodes storing the public data in the blockchain network and private data related to the plurality service nodes, the plurality of services nodes in the witness network generating transaction data and uploading the transaction data to the consensus network without participating in accounting consensus, the method comprising:

- receiving a data acquisition request transmitted by a target service node, the data acquisition request carrying a data type of data requested by the target service node and a data identifier set;
- determining a target node set from the nodes comprised in the blockchain network according to the data type, the data identifier set, and recorded data storage information of the nodes in the blockchain network, the target node set comprising one or more of node information determined from the service nodes in the witness network and node information determined from the consensus nodes in the consensus network, wherein the data storage information comprises data cache information, the plurality of service nodes record different data cache information, and the determining the target node set from the nodes comprised in the blockchain network comprises:
  - in response to the data type being a first data type, determining the target node set from the plurality of service nodes comprised in the witness network according to the data identifier set and recorded data cache information of the service nodes in the witness network, the target node set comprising the node information determined from the service nodes in the witness network; and
- transmitting feedback information carrying the node information comprised in the target node set to the target service node, the feedback information being for instructing the target service node to acquire the requested data from a node according to the node information comprised in the target node set.

2. The method according to claim 1, wherein the determining the target node set from the plurality of service nodes comprised in the witness network comprises: determining the target node set from the plurality of service nodes comprised in the witness network according to the data identifier set, the recorded data cache information and network performance parameters of the service nodes in the witness network.

3. The method according to claim 1, wherein the data storage information comprises data cache information, and the determining the target node set from the nodes comprised in the blockchain network comprises:

in response to the data type being a second data type, determining the target node set from a plurality of consensus nodes comprised in the consensus network according to the data identifier set and recorded data cache information of the consensus nodes in the consensus network, the target node set comprising the node information determined from the consensus nodes of the consensus network.

4. The method according to claim 3, wherein the data acquisition request further carries identity authentication information of the target service node, and before the determining the target node set from the plurality of consensus nodes comprised in the consensus network, the method further comprises:

performing identity authentication on the target service node according to the identity authentication information;

in response to an identity authentication result indicating that the identity authentication of the target service node succeeds, determining, according to the data identifier set and recorded data authorization information on the target service node, whether the target service node has a permission to acquire the data requested by the target service node; and in response to the target service node having the permission, determining the target node set from the plurality of consensus nodes comprised in the consensus network according to the data identifier set and the recorded data cache information of the consensus nodes in the consensus network.

5. The method according to claim 1, wherein the method further comprises:

determining a data cache policy on the consensus nodes in the consensus network, and generating a data cache request according to the data cache policy; and transmitting the data cache request to the consensus nodes in the consensus network to enable the consensus nodes in the consensus network to cache data related to some service nodes in the witness network according to an indication of the data cache policy.

6. The method according to claim 1, wherein before the determining the target node set from the nodes comprised in the blockchain network, the method further comprises:

detecting whether an allocation management tool in the gateway device runs normally;

in response to the allocation management tool running normally, triggering the allocation management tool to determine the target node set from the nodes comprised in the blockchain network according to the data type, the data identifier set, and the recorded data storage information of the nodes in the blockchain network.

7. The method according to claim 6, wherein the method further comprises:

in response to the allocation management tool running abnormally, making, according to a peer-to-peer routing table polling policy, a response to the data acquisition request transmitted by the target service node.

8. The method according to claim 1, wherein the method further comprises:

receiving a data synchronization request transmitted by the target service node, the data synchronization request carrying stored data update information of the target service node; and updating recorded data storage information of the target service node based on the stored data update information.

9. The method according to claim 8, wherein the method further comprises:

in response to the data synchronization request carrying network performance parameters of the target service node, updating recorded network performance parameters of the target service node based on the network performance parameters carried in the data synchronization request.

10. The method according to claim 9, wherein the method further comprises:

acquiring current network performance parameters of the target service node at preset time intervals; and updating, based on the acquired current network performance parameters, the recorded network performance parameters of the target service node.

11. A data processing apparatus based on a blockchain network, the blockchain network comprising a witness network and a consensus network, the witness network being located in a public network and formed by networking a plurality of service nodes, the consensus network being located in a private network and formed by networking a plurality of consensus nodes, the witness network and the consensus network being connected by a gateway device, the plurality of services nodes storing public data in the blockchain network, the plurality of consensus nodes storing the public data in the blockchain network and private data related to the plurality service nodes, the plurality of services nodes in the witness network generating transaction data and uploading the transaction data to the consensus network without participating in accounting consensus, the apparatus comprising:

a memory operable to store computer-readable instructions; and a processor circuitry operable to read the computer-readable instructions, the processor circuitry when executing the computer-readable instructions is configured to:

receive a data acquisition request transmitted by a target service node, the data acquisition request carrying a data type of data requested by the target service node and a data identifier set;

determine a target node set from the nodes comprised in the blockchain network according to the data type, the data identifier set, and recorded data storage information of the nodes in the blockchain network, the target node set comprising one or more of node information determined from the service nodes in the witness network and node information determined from the consensus nodes in the consensus network, wherein the data storage information comprises data cache information, the plurality of service nodes record different data cache information, and the processor circuitry is configured to, in response to the data type being a first data type, determine the target node set from the plurality of service nodes comprised in the witness network according to the data identifier set and recorded data cache information of the service nodes in the witness network, the target node set comprising the node information determined from the service nodes in the witness network; and transmit feedback information carrying the node information comprised in the target node set to the target service node, the feedback information being for instructing the target service node to acquire the requested data from a node according to the node information comprised in the target node set.

12. The apparatus according to claim 11, wherein the data storage information comprises data cache information, and the processor circuitry is configured to:

in response to the data type being a first data type, determine the target node set from the plurality of service nodes comprised in the witness network according to the data identifier set and recorded data cache information of the service nodes in the witness network, the target node set comprising the node information determined from the service nodes in the witness network.

13. The apparatus according to claim 12, wherein the processor circuitry is configured to:

determine the target node set from the plurality of service nodes comprised in the witness network according to the data identifier set, the recorded data cache information and network performance parameters of the service nodes in the witness network.

14. The apparatus according to claim 11, wherein the data storage information comprises data cache information, and the processor circuitry is configured to:

in response to the data type being a second data type, determine the target node set from a plurality of consensus nodes comprised in the consensus network according to the data identifier set and recorded data cache information of the consensus nodes in the consensus network, the target node set comprising the node information determined from the consensus nodes of the consensus network.

15. The apparatus according to claim 14, wherein the data acquisition request further carries identity authentication information of the target service node, and the processor circuitry is further configured to:

perform identity authentication on the target service node according to the identity authentication information;

in response to an identity authentication result indicating that the identity authentication of the target service node succeeds, determine, according to the data identifier set and recorded data authorization information on the target service node, whether the target service node has a permission to acquire the data requested by the target service node; and in response to the target service node having the permission, determine the target node set from the plurality of consensus nodes comprised in the consensus network according to the data identifier set and the recorded data cache information of the consensus nodes in the consensus network.

16. The apparatus according to claim 11, wherein the processor circuitry is further configured to:

determine a data cache policy on the consensus nodes in the consensus network, and generate a data cache request according to the data cache policy; and transmit the data cache request to the consensus nodes in the consensus network to enable the consensus nodes in the consensus network to cache data related to some service nodes in the witness network according to an indication of the data cache policy.

17. The apparatus according to claim 11, wherein the processor circuitry is further configured to:

detect whether an allocation management tool in the gateway device runs normally;

in response to the allocation management tool running normally, trigger the allocation management tool to determine the target node set from the nodes comprised in the blockchain network according to the data type, the data identifier set, and the recorded data storage information of the nodes in the blockchain network; and in response to the allocation management tool running abnormally, make, according to a peer-to-peer routing table polling policy, a response to the data acquisition request transmitted by the target service node.

18. The apparatus according to claim 11, wherein the processor circuitry is further configured to:

receive a data synchronization request transmitted by the target service node, the data synchronization request carrying stored data update information of the target service node; and update recorded data storage information of the target service node based on the stored data update information.

19. A non-transitory machine-readable media, having instructions stored on the machine-readable media, the instructions configured to process data in a blockchain network, the blockchain network comprising a witness network and a consensus network, the witness network being located in a public network and formed by networking a plurality of service nodes, the consensus network being located in a private network and formed by networking a plurality of consensus nodes, the witness network and the consensus network being connected by a gateway device, the plurality of services nodes storing public data in the blockchain network, the plurality of consensus nodes storing the public data in the blockchain network and private data related to the plurality service nodes, the plurality of services nodes in the witness network generating transaction data and uploading the transaction data to the consensus network without participating in accounting consensus, the instructions configured to, when executed, cause a machine to:

receive a data acquisition request transmitted by a target service node, the data acquisition request carrying a data type of data requested by the target service node and a data identifier set;

determine a target node set from the nodes comprised in the blockchain network according to the data type, the data identifier set, and recorded data storage information of the nodes in the blockchain network, the target node set comprising one or more of node information determined from the service nodes in the witness network and node information determined from the consensus nodes in the consensus network, wherein the data storage information comprises data cache information, the plurality of service nodes record different data cache information, and the instructions are configured to cause the machine to, in response to the data type being a first data type, determine the target node set from the plurality of service nodes comprised in the witness network according to the data identifier set and recorded data cache information of the service nodes in the witness network, the target node set comprising the node information determined from the service nodes in the witness network; and transmit feedback information carrying the node information comprised in the target node set to the target service node, the feedback information being for instructing the target service node to acquire the requested data from a node according to the node information comprised in the target node set.

* * * * *